United States Patent Office 2,897,653
Patented Aug. 4, 1959

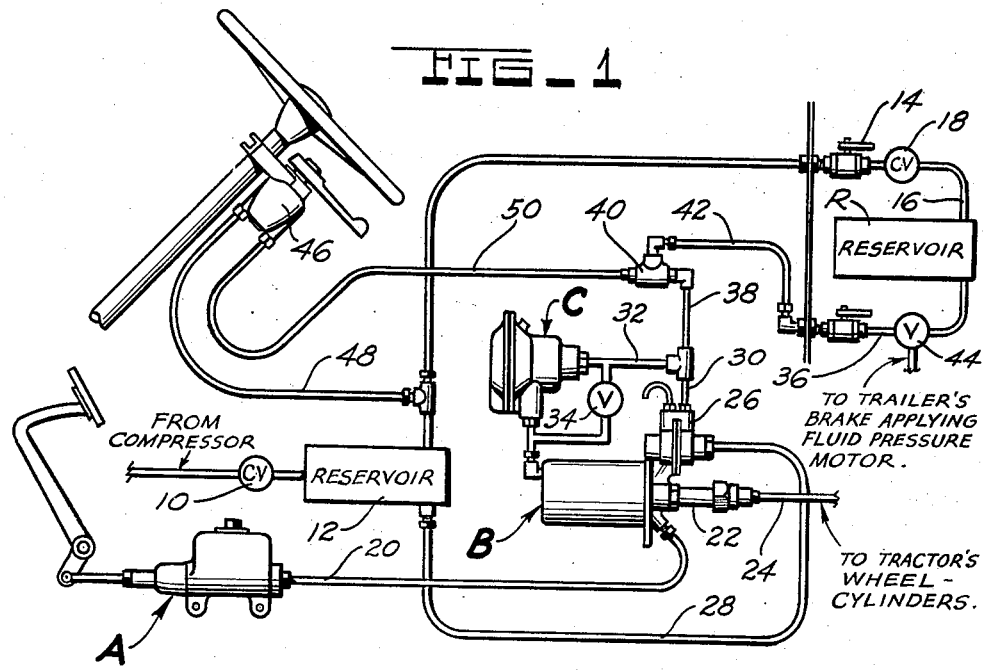
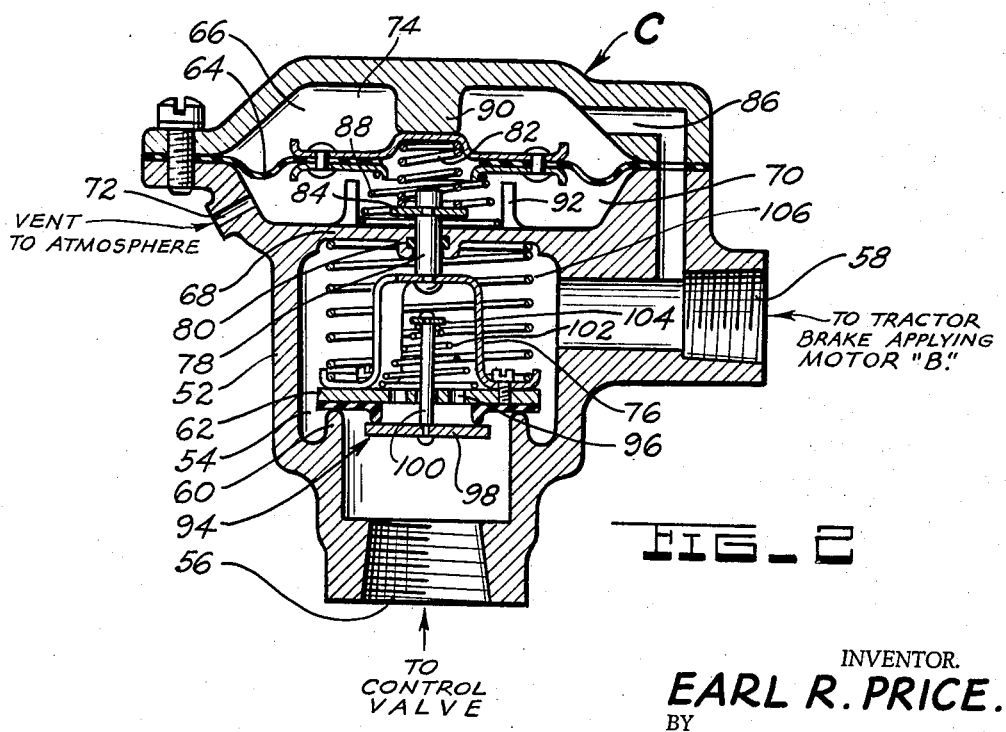

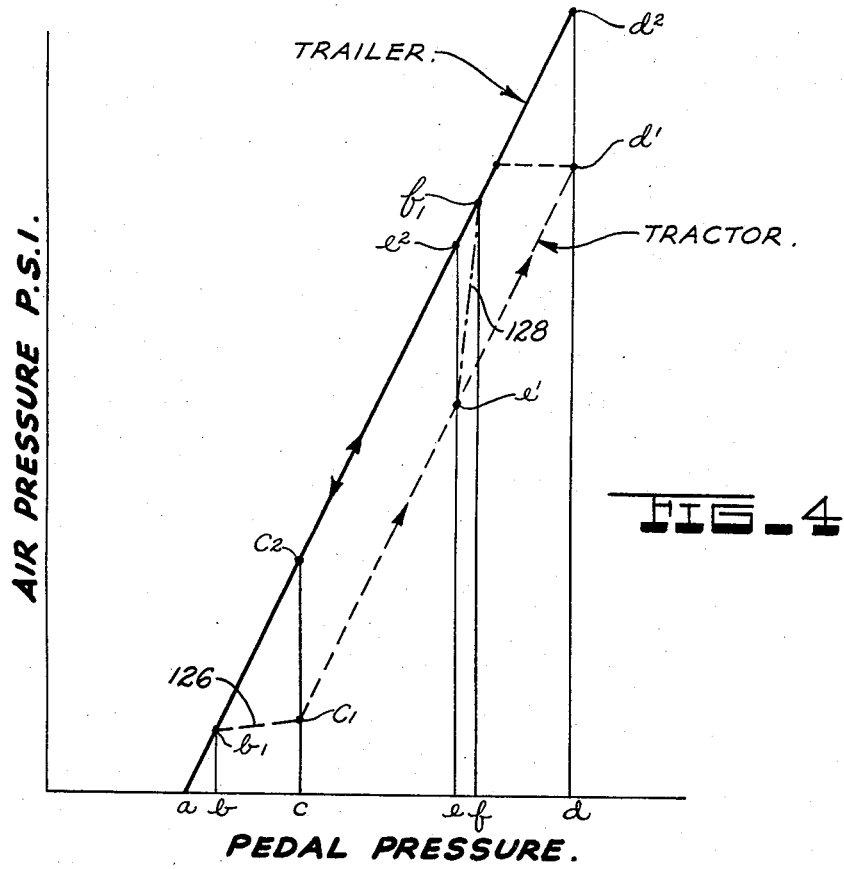
FIG_4
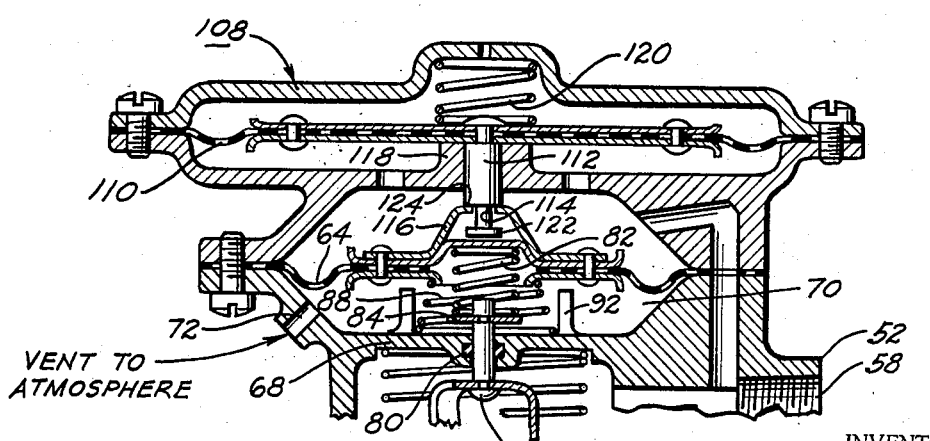
FIG_3
INVENTOR.
EARL R. PRICE.
BY
William P. Hickey
ATTORNEY.

2,897,653

TRAILER SYNCHRONIZING VALVE

Earl R. Price, South Bend, Ind., assignor to Bendix Aviation Corporation, South Bend, Ind., a corporation of Delaware Application September 23, 1957, Serial No. 685,698

9 Claims. (Cl. 60—97)

The present invention relates to fluid pressure systems in which a single control valve is used to actuate two fluid pressure motors with pressures of different intensity; and more particularly to a braking system for a vehicle train having leading and trailing portions which are operated simultaneously by a single control valve in a manner supplying a greater actuating pressure to the brakes of the trailing portion than is supplied to the brakes of the leading portion.

An object of the present invention is the provision of a new and improved pneumatic control system of a type capable of being used to actuate the brake applying fluid pressure motor on a trailing portion of a vehicle train with an intensity greater than the brake applying fluid pressure motor on a leading portion of a vehicle train, and comprising: a control valve for supplying pressure to each of the two fluid pressure motors, and means which reduces the pressure supplied to one of the fluid pressure motors by said control valve below that being supplied to the other of the fluid pressure motors.

Another object of the present invention is the provision of a new and improved magnetic control system of the above referred to type which will supply the same pressure to the two fluid pressure motors at pressure intensities below a generally predetermined level, and which will thereafter supply a pressure to one of the fluid pressure motors which is less than that being supplied to the other fluid pressure motor by a generally predetermined amount.

A further object of the invention is the provision of a new and improved control valve of the above referred to type which will supply the same fluid pressure to both fluid pressure motors at system pressures above a generally predetermined level.

A more specific object of the invention is the provision of new and improved valve structure for performing the above objects, which structure is simple and rugged in design, reliable and efficient in its operation, and which is inexpensive to manufacture.

Further objects and advantages of the present invention will become apparent to those skilled in the art to which it relates from the following description of the preferred embodiments described with reference to the accompanying drawings forming a part of this specification, and in which:

Figure 1 is a schematic drawing of a portion of an air pressure operated tractor-trailer braking system embodying principles of the present invention;

Figure 2 is a cross-sectional view of a valve structure shown in Figure 1;

Figure 3 is a fragmentary cross-sectional view of another form of valve structure which may be used in place of that shown in Figure 2; and Figure 4 is a graph of a pressure supplied by the system to the tractor and trailer brake applying motors for various actuating pedal forces and embodiments of the invention described herein.

The tractor-trailer truck braking system shown in Figure 1 is what is known in the art as an "Air Over Hydraulic System"; in which the brakes of the tractor portion are operated by means of a first air pressure operated servomotor which hydraulically actuates the brakes on the tractor portion of the vehicle; and in which air pressure is used to actuate second brake applying air pressure motors on the trailing portion of the vehicle. A sizable percentage of the tractor-trailer trucks being built today utilize braking systems on both the tractor portion and the trailer portion of the vehicles which are actuated by air motors that are supplied with air pressure from a compressor mounted on the tractor portion of the vehicle. It has been customary in those vehicles in which air pressure in the neighborhood of 85 pounds pressure is provided to actuate the vehicle's brakes, to use brake structures which have very little self-energization.

It is also true, however, that a sizable percentage of the tractor trucks presently being made are provided with a basic brake structure which is hydraulically actuated. Trucks of this type will be manufactured with a brake pedal lever operated master cylinder A, whose discharge will be connected directly with the tractor's brake applying wheel cylinders. Where such is the case, the basic brake structure operated by the hydraulic system will be made to employ a certain amount of self-energization to help in the braking effort produced. Where tractor trucks equipped with hydraulic braking systems are to be used in drawing trailers having air operated braking systems of the type previously mentioned, an air system of the type shown in Figure 1 is provided on the tractor; such that the trailer's brakes can be operated off of, or by means of, the hydraulic braking system of the tractor. Under such an arrangement, a reservoir, not shown, supplies pressure through a check valve 10 to the reservoir 12, which in turn supplies pressure both to a coupling 14 for connection with an air service line 16 of a trailer to be towed by the tractor and having a check valve 18 and reservoir R thereon. The reservoir 12 also supplies pressure to an air pressure, servomotor driven, hydraulic cylinder B mounted on the tractor, and whose hydraulic cylinder is connected to the tractor's brake applying wheel cylinders. The discharge line 20 from the master cylinder A is connected with the hydraulic cylinder portion 22 of the servomotor B; and the hydraulic cylinder portion 22 is so constructed as to communicate pressure from the line 20 directly to the discharge line 24 of the hydraulic cylinder portion 22 whenever the power piston (not shown) of the servomotor B is in its non-actuated position; so that the brakes of the tractor may be operated directly from pressure supplied from the master cylinder A upon power failure. The servomotor B is also equipped with a pneumatic control valve 26 that is actuated by the hydraulic pressure being supplied to the hydraulic cylinder portion 22 from the master cylinder A and is constructed in such manner as to communicate air pressure from the reservoir supply line 28 to the back side of the servomotor's power piston (not shown) when the master cylinder A is actuated. The discharge pressure from the control valve 26 will pass through the control line 30 to a by-pass line 32 having a shut-off valve 34 therein, which when opened, communicates the pressure to the back side of the servomotor unit B. Pressure from the control line 30 is at the same time communicated with the control system of the trailer, attached to and being drawn by the tractor, through the branch line 38, shuttle cock 40, and connecting line 42 adapted to be quickly connected and disconnected from the trailer control line 36. Pressure in the trailer control line 36 is used to actuate a control valve 44 in the trailer's braking system, which valve when actuated communicates air pressure from the trailer's reservoir R to air pressure motors (not shown) mounted on the trailer and which actuate the trailer's brakes.

The usual tractor braking system will also employ a hand control valve 46 supplied with pressure from the reservoir 12 through a supply line 48—the discharge or control pressure of which is supplied through control line 50 to the shuttle cock 40. The shuttle cock 40 is supplied with pressure, both from the control valve 26, and the hand control valve 46, and is so constructed and arranged as to supply whichever of these pressures is greatest to the connecting line 42 leading to the trailing portion of the vehicle. For a more complete understanding of the construction and operation of the air pressure servomotor above described, reference may be had to Patent 2,661,598; and for a more complete description of the construction and operation of the shuttle cock 40, reference may be had to Patent 2,719,609.

The tractor-trailer braking system so far described is that presently being produced commercially, and is deficient by reason of the fact that the brakes on the trailer require greater pressures than does the servomotor B to produce a brake intensity on the trailer portion which will match that produced in the tractor. The present invention is directed toward means which will regulate the discharge pressure from the control valve 26 in such manner as to supply a greater pressure to the trailer's braking system than is supplied to the air pressure operated servomotor B. Where the brakes on the trailer and tractor are mismatched as above described, valve 34 in the by-pass line 32 may be closed, and the valve structure C (about to be described) will then be used to decrease the portion of the output pressure from the control valve 26 that is supplied to the servomotor B, while permitting full control valve pressure to be delivered to the trailer's braking system.

The valve structure C, shown in Figures 1 and 2 of the drawing, generally comprises a body member 52 having a valve chamber 54 therein that is provided with an inlet port 56 communicating with the servomotor B, and an outlet port 58 communicating with the bypass line 32. An annular valve seat 60 surrounds the inlet port 56 in a manner projecting into the valve chamber 54, and a valve closure or poppet member 62 is positioned in the valve chamber 54 for abutment with the valve seat 60. The valve poppet member 62 is adapted to be moved towards and away from the valve seat 60 by means of a pressure responsive or diaphragm member 64 positioned in the fluid pressure motor chamber 66—which chamber is spaced opposite to the valve seat 60, and separated from the valve chamber 54, by means of a fixed partition wall 68. The diaphragm member 64 divides the motor chamber 66 into a lower opposing chamber 70, which is communicated to the atmosphere through port 72, and an upper opposing chamber 74, which is supplied with pressure from one of the flow conducting portions of the valve. A spider 76 is suitably affixed to the upper face of the poppet member 62 as seen in Figure 2, and a stem 78 is affixed to the upper end of spider 76 in a manner projecting through an opening in the partition wall 68. A suitable O-ring seal 80 is positioned in the partition wall 68 to effect a seal with respect to the stem 78, and a compression spring 82 is interpositioned between the diaphragm structure 64 and an abutment washer 84 suitably affixed to the upper end of the stem 78. In the embodiment shown in Figure 2, the upper opposing chamber 74 is communicated with the outlet port 58 by means of a drilled passageway 86 in the body member 52. It will therefore be seen that pressure build-up within the flow conducting passages of the valve structure produces a force upon the diaphragm 64 which biases the valve poppet member 62 against its seat. While some utility would be derived by permitting the force which biases the poppet member 62 against its seat 60 to increase as the pressure within the flow through passages of the valve increases, the preferred arrangement provides means which will limit the amount of force which can be delivered against the valve poppet 62; so that after a predetermined pressure is reached, a fixed pressure drop will be experienced across the valve poppet member 62. This is accomplished in the structure shown in Figure 2 by means of a reaction coil spring 88 positioned between the bottom of the diaphragm 64 and the partition wall 68 in a manner to bias the diaphragm 64 away from the poppet member 62 into engagement with an abutment 90 in the upper opposing chamber 74. If no preloading is built into the coil spring 88, pressure delivered to the upper opposing chamber 74 will start to deliver valve closing force against the poppet member 62 as soon as pressure is delivered to the upper opposing chamber 74. If preloading is built into the coil spring 88, a predetermined amount of pressure will have to be delivered to the upper opposing chamber 74 before the diaphragm structure 64 will start to move to deliver valve closing force against the valve poppet member 62. In the preferred embodiment, a predetermined amount of preloading is built into the coil spring 88; so that substantially no valve closing force is delivered to the poppet 62 until a first generally predetermined pressure level is developed within the flow through passages of the valve. After this generally predetermined pressure is delivered to the upper opposing chamber 74, additional pressure will start to compress the coil spring 88. As the pressure in the upper opposing chamber 74 increases above this predetermined level, downward movement of the diaphragm 64 will be experienced at a rate depending upon the spring rate of the reaction coil spring 88, until such time as the diaphragm structure 64 moves into engagement with abutment 92 in the lower opposing chamber 70. A slight build-up in pressure is therefore required in the upper opposing chamber 74 in order to overcome the spring rate of the reaction coil spring 88 and move the diaphragm 64 from the upper abutment 90 into engagement with the lower abutment 92.

As previously indicated, movement of the diaphragm 64 is transmitted to the poppet member 62 through the compression spring 82. If the compression spring 82 is preloaded against the poppet member 62, a predetermined pressure will be required in the inlet port 56 sufficient to overcome this preloading force of the spring before flow will be communicated with the outlet port 58 of the valve. In the preferred embodiment, however, a slight amount of clearance will be provided between the coil compression spring 82 and the diaphragm structure 64; so that no preloading force will be delivered against the poppet member 62; and so that substantially the same pressure will be experienced in the outlet port 58 as is experienced in the inlet port 56 until the lower generally predetermined pressure level is reached. As this generally predetermined pressure level is reached, reaction coil spring 88 yields to permit a loading of the compression spring 82 to transmit force from the diaphragm 64 upon the compression spring 82. This force, of course, will be delivered directly to the poppet member 62; and depending upon the spring rate of compression spring 82, a slight build-up in pressure will be required in the upper opposing chamber 74 before the diaphragm 64 can compress the compression spring 82 sufficiently to permit the diaphragm 64 to move into engagement with the lower abutment 92. Thereafter, a fixed force will be delivered to the poppet member 62 tending to hold it against its seat 60; so that, thereafter, a fixed pressure drop will be experienced between the outlet port 58 and the inlet port 56.

To complete the description of the structure shown in Figure 2, a check valve 94 is provided in the poppet member 62 to permit return flow to the valve structure 26. The check valve structure 94 comprises a plurality of openings 96 drilled through the poppet member 62, and a closure member 98 is positioned against the lower surface of the poppet member 62 to prevent flow from the inlet port 56 from passing through the opening 96. The valve closure member 98 is provided with a stem 100 which passes through a suitable opening in the poppet member 62, and which is biased upwardly by a coil spring 102 positioned between the upper end of the poppet member 62 and a suitable abutment washer 104 fixed to the upper end of the stem 100. A delay spring 106 may also be provided between the poppet member 62 and the partition wall 68 to provide an additional closure force tending to seat the poppet against its seat 60.

A further refinement may be provided in the valve structure shown in Figure 2 by the incorporation of the top work structure shown in Figure 3 of the drawings. By the incorporation of the structure shown in Figure 3 into the valve structure shown in Figure 2, a force is developed which overcomes the biasing force of the diaphragm 64 against the poppet member 62 at pressure levels above a second generally predetermined level, so as to thereafter permit substantially the same pressure to be delivered to the outlet port 58 of the valve as is delivered to its inlet port 56. The structure shown in Figure 3 comprises a second fluid pressure motor 108 having a pressure responsive element, or diaphragm 110 which is larger than the pressure responsive element, or diaphragm 64, and against which pressure is communicated in a direction which will oppose pressure forces against the diaphragm 64. As shown in the drawing, the same pressure which is delivered to the upper end of the diaphragm 64 is delivered against the lower surface of the upper diaphragm 110; and the upper end of diaphragm 110 is vented to the atmosphere. The diaphragm 110 is provided with a stem 112 which projects into the proximity of the diaphragm 64. The stem 112 is operatively connected to the diaphragm by means of a lost motion connection formed by a reduced diameter section 114 in the stem 112, and suitable fingers 116 which are fixed to the diaphragm 64, and which project into the reduced diameter section 114 of the stem 112. The reduced diameter section 114 is of a sufficient length so as to accommodate the necessary movement of the diaphragm 64 during its movement from its upper position, into its lower position abutting abutment 92. The upper pressure responsive diaphragm 110 is biased against a lower abutment 118 by a delay spring 120; so that the diaphragm 110 will not oppose the movement of the diaphragm 64 until a second generally predetermined pressure level is experienced in the flow through chambers of the valve. When pressures above this second generally predetermined level are reached, spring 120 is compressed by the diaphragm 110, thereby permitting the lower headed end of the stem 112 to pick up the fingers 116 and remove the force developed by the diaphragm 64 from the compression spring 82. In the embodiment shown in Figure 3, the delay spring 120 is made stiffer than the springs 82 and 88; to hold shoulder 124 provided by the upper end of the reduced diameter section 114 in the stem 112 against the fingers 116 and thereby act as an upper stop for diaphragm 64.

The operation of the system shown in Figure 1 will be initiated by the depressing of the foot pedal lever of the master cylinder A to develop an actuating force upon the control valve 26. Actuation of the control valve 26 causes modulated outlet pressure to be delivered directly to both the trailer's brake applying fluid pressure motors and the control valve structure C previously described. In order that the several embodiments of the invention may be better understood, reference may be had to the graph shown in Figure 4, which graph shows the various pressures developed during actuation of the system for each of the various embodiments of the invention.

In the preferred construction of the embodiment shown in Figure 2, wherein no preloading of the compression spring 82 is provided against the diaphragm 64, and, wherein, a predetermined loading of the reaction coil spring 88 is provided against the diahpragm 64, increasing force upon the foot pedal lever will continue until the point $a$ is reached, and at which time the control valve 26 is actuated. (In the description of the operation of the device about to be described, spring 106 will be considered as being deleted from the valve.) Actuation of the valve 26, thereafter causes pressure build-up in the inlet port 56 of the valve; and inasmuch as no spring loading is provided upon the poppet member 62, the same pressure will be delivered to the outlet port 58 until such time as a first generally predetermined level is reached. Thereafter, the reaction coil spring 88 will start to yield—thereby delivering force from the diaphragm 64, to the compression spring 82, and thence upon the poppet member 62. During this stage of valve operation, the force upon the pedal will increase from the point $b$ to the point $c$, and a build-up in pressure drop will be experienced across the poppet member 62. During this pressure build-up, the coil spring 82 is compressed sufficiently to permit the diaphragm 64 to move into an engagement with the lower abutment 92; and at the end of this stage, a pressure intensity of $c_1$ will be experienced in the outlet port 58 while an inlet pressure of $c_2$ will be experienced in the inlet port 56. Thereafter, increased force upon the pedal lever causes the pressure in both ports 56 and 58 to rise at the same rate, with the pressure in the port 58 being less than that in the port 56 by a fixed amount, until such time as the maximum reservoir pressure is reached (as indicated by $d$ in Figure 4 of the drawing). At this time pressure $d_1$ will be experienced in the outlet port 58, and the pressure $d_2$ will be experienced in the inlet port 56.

At any time during this operation that the operator desires to decrease the braking effort of the vehicle, a retraction of the foot pedal lever causes the control valve 26 to decrease the pressure in the inlet port 56 until such time as it is equal to the pressure in the outlet port 58. Thereafter, a further decrease in outlet pressure from the control valve 26 will permit flow from the outlet port 58 through the check valve structure 94 to the inlet port 56; so that the pressure in the tractor and trailer portions of the braking system will be lowered simultaneously.

During the deceleration of a semitrailer truck, load from the trailer portion is gradually shifted to the tractor portion of the vehicle; so that during large decelerations of the vehicle, a greater proportion of the vehicle's braking effect can be achieved by the tractor portion than can be produced by the trailer portion. Inasmuch as the structure shown in Figure 2 of the drawing reduces the air actuating pressure to the brake applying motor of the tractor below that supplied to the brake applying motor of the trailer, it may be desirable in some instances to override the control means K during emergency stops and deliver full air pressure to the brake applying motor of the tractor. The structure shown in Figure 3 of the drawings will accomplish this objective and is intended to be used with the structure shown in Figure 2 of the drawings. At some predetermined pressure level, the structure shown in Figure 3 overrides the diaphragm 64 and gradually causes the same pressure to be delivered to the tractor portion of the vehicle as is being applied to the trailer portion of the vehicle; so that thereafter a greater proportion of the total braking effort will be done by the tractor portion of the vehicle than was done initially.

In the embodiment provided by the composite structures of Figure 2 and Figure 3 of the drawings (assuming the same coil springs 82 and 88 are utilized), operation of the system will continue as above described until such time as a second predetermined pressure level is reached in the outlet port 58—at which time, sufficient pressure will be delivered against the bottom side of the diaphragm 110 to cause a yielding of the delay spring 120. (For the purposes of the present discussion, let us assume that this occurs at a pedal pressure e shown in Figure 4—at which time the pressure in the outlet port 58 will be indicated by the point $e_1$ and the pressure in the inlet port 56 will be indicated by the point $e_2$.) Increased pedal pressure, thereafter, causes a yielding of the delay spring 120, which in turn causes more and more force to be removed from the valve poppet 62, until such time as the coil spring 120 is compressed sufficiently to move the diaphragm 62 out of engagement with the compression spring 82. This will occur at the pedal pressure f; and thereafter, the pressure in the outlet port 58 will be substantially equal to that in the inlet port 56.

In the operation of the device formed by the composite structure of Figures 2 and 3 of the drawings, operation of the foot pedal lever of the master cylinder A increases until the control valve 26 begins to operate (point a in Figure 4), after which time the output pressure from the control valve 26 will be delivered to both the trailer's brakes and to the servomotor B on the tractor portion of the vehicle. Equal pressure build-up in both portions of the vehicle will continue until the point b in Figure 4 is reached, at which time sufficient pressure is delivered on top of the diaphragm 64 to cause the diaphragm to move into engagement with the coil spring 82, and thereafter transmit increasing force to the poppet valve 62. This will continue until the pedal pressure has reached the point c, at which time, the diaphragm 64 has moved into engagement with the bottom abutment 92 thereby limiting the amount of force which the diaphragm 64 can deliver to the poppet 62. At this time, the air pressure being supplied the tractor portion of the vehicle will be indicated by $c_1$ in Figure 4, and the amount of air pressure delivered to the trailer portion of the vehicle will be indicated by the point $c_2$ in Figure 4. Increasing pedal pressure thereafter will cause the pressure in the outlet port 58 of the valve structure C to increase at the same rate as the pressure being supplied to its inlet port 56; with the pressure in the outlet port 58 being less than that in the inlet port 56 by an amount determined by the force of the coil spring 82. The pressures in the trailer and tractor portions of the vehicle will therefore increase at the same rate until the pedal pressure reaches the point e in Figure 4 at which time the air pressure being supplied the tractor is indicated by the point $e_1$ and the air pressure being supplied the trailer as indicated by the point $e_2$.

At the point e indicated in Figure 4 sufficient air pressure has been delivered to the bottom side of the upper diaphragm 110 to cause a yielding of its delay spring 120 sufficiently to bring the head 122 into engagement with the fingers 116. Thereafter, a further application of the pedal causes a continued increase in pressure to be delivered against the bottom side of the diaphragm 110, which in turn moves the lower diaphragm 64 upwardly from its lower abutment 92, and thereby decreases the amount of force delivered against the poppet 62 by the coil spring 82. The pressure in the tractor portion of the vehicle will therefore increase, as shown by the line 128 in the Figure 4, while the pressure in the trailer portion of the vehicle increases at a much slower rate, indicated by the portion of the line between points $e_1$ and the point $f_1$. A further increase in pedal pressure will thereafter cause the same pressure to be delivered to both portions of the vehicle; and inasmuch as the brakes of the tractor portion of the vehicle are more effective than those on the trailer portion of the vehicle, a greater braking effort will now be produced on the tractor portion than is produced on the trailer portion of the vehicle. In the preferred embodiment shown, the point f will be reached at a time prior to the time at which the trailer's brakes begin to slide; and in the preferred embodiment, the matching of the trailer and tractor portions of the vehicle's braking system will be such that the brakes on the tractor and trailer portions will begin to slide at approximately the same time when the trailer portion of the vehicle is fully loaded.

A retraction of the foot pedal lever, reduces the pressure in the inlet port 56 permitting the check valve 94 to open and pressure in the two ports 56 and 58 to be reduced simultaneously.

It will be obvious to those skilled in the art that the preloading of the springs 82 and 88 determine the lower level at which divergence of the pressures in the two ports 56 and 58 is experienced; and that if no preloading is provided in these springs, divergence in the two systems will begin at the point a indicated in Figure 4 of the drawings. It will further be apparent that the spring rates of these two springs determines the slope of the line 126 of the graph; and that the preloading of the delay spring 120 determines the point $e_1$ of the graph. It will further be apparent to those skilled in the art, that the angle of the line 128 of the graph will be determined by the relative spring rates of the delay spring 120 with respect to the spring rates of the springs 82 and 88; and that this line may be made substantially vertical if the spring rate of spring 120 is negligible. The delay spring 106 may or may not be used to provide an initial seating force upon the poppet member 62.

While the preferred embodiments of the invention have been described in considerable detail, I do not wish to be limited to the particular constructions shown and described; it is my intention to cover hereby all novel adaptations, modifications and arrangements thereof, which come within the practice of those skilled in the art, to which the invention relates.

I claim:

1. In a system for regulating flow of fluid from a pressure source to first and second fluid pressure motors: a control valve supplied with pressure from said source, first flow communication means communicating the discharge of said control valve with said first fluid pressure motor, second flow communication means communicating the discharge of said control valve with said second fluid pressure motor, a back pressure valve in said first flow communication means for restricting flow from said control valve to said first fluid pressure motor, a spring for urging said back pressure valve closed when said spring is loaded, means responsive to pressure in said system for loading said spring as the pressure in said system builds up from a first generally predetermined level, and means for permitting flow past said last mentioned means in the reverse direction.

2. In a system for regulating flow of fluid from a pressure source to first and second fluid pressure motors: a control valve supplied with pressure from said source, first flow communication means communicating the discharge of said control valve with said first fluid pressure motor, second flow communication means communicating the discharge of said control valve with said second fluid pressure motor, a back pressure valve in said first flow communication means for restricting flow from said control valve to said first fluid pressure motor, a spring for urging said back pressure valve closed when said spring is loaded, means responsive to pressure in said system for loading said spring as the pressure in said system builds up from a first generally predetermined level, means limiting the loading of said spring to a first generally predetermined amount, and means for permitting flow past said last mentioned means in the reverse direction.

3. In a system for regulating flow of fluid from a pressure source to first and second fluid pressure motors: a control valve supplied with pressure from said source, first flow communication means communicating the discharge of said control valve with said first fluid pressure motor, second flow communication means communicating the discharge of said control valve with said second fluid pressure motor, a back pressure valve in said first flow communication means for restricting flow from said control valve to said first fluid pressure motor, a spring for urging said back pressure valve closed when said spring is loaded, means responsive to pressure in said system for loading said spring as the pressure in said system builds up from a first generally predetermined level, means limiting the loading of said spring to a first generally predetermined amount, means responsive to pressure in said system for unloading said spring after the pressure in said system exceeds a second generally predetermined level, and means for permitting flow past said last mentioned means in the reverse direction.

4. In a system for regulating flow of fluid from a pressure source to first and second fluid pressure motors: a control valve supplied with pressure from said source, first flow communication means communicating the discharge of said control valve with said first fluid pressure motor, second flow communication means communicating the discharge of said control valve with said second fluid pressure motor, a valve seat in said first flow communication means facing in the direction of flow toward said first fluid pressure motor, a valve poppet for closing off said valve seat, normally unloaded spring means for biasing said poppet valve against its seat, and a pressure responsive element for loading said spring means to bias said poppet against its seat when pressure above a predetermined intensity is supplied to one side of said pressure responsive member from said system.

5. In a system for regulating flow of fluid from a pressure source to first and second fluid pressure motors: a control valve supplied with pressure from said source, first flow communication means communicating the discharge of said control valve with said first fluid pressure motor, second flow communication means communicating the discharge of said control valve with said second fluid pressure motor, a valve seat in said first flow communication means facing in the direction of flow toward said first fluid pressure motor, a valve poppet for closing off said valve seat, a first spring means for biasing said poppet valve against its seat, a pressure responsive member for deforming said spring to bias said poppet against its seat as pressure from said system is supplied to one side of said pressure responsive member, and second spring means for opposing deformation of said first spring means by said pressure responsive member until a first generally predetermined pressure is supplied to said one side of said pressure responsive member.

6. In a system for regulating flow of fluid from a pressure source to first and second fluid pressure motors: a control valve supplied with pressure from said source, first flow communication means communicating the discharge of said control valve with said first fluid pressure motor, second flow communication means communicating the discharge of said control valve with said second fluid pressure motor, a valve seat in said first flow communication means facing in the direction of flow toward said first fluid pressure motor, a first valve poppet for closing off said valve seat, first spring means for biasing said poppet valve against its seat, a pressure responsive member for deforming said spring to bias said poppet against its seat as pressure from said system is supplied to one side of said pressure responsive member, second spring means for opposing deformation of said first spring means by said pressure responsive member until a first generally predetermined pressure is supplied to said one side of said pressure reponsive member, and means limiting the amount of deformation which said pressure responsive member can produce on said first spring means.

7. In a system for regulating flow of fluid from a pressure source to first and second fluid pressure motors: a control valve supplied with pressure from said source, first flow communication means communicating the discharge of said control valve with said first fluid pressure motor, second flow communication means communicating the discharge of said control valve with said second fluid pressure motor, a valve seat in said first flow communication means facing in the direction of flow toward said first fluid pressure motor, a first valve poppet for closing off said valve seat, first spring means for biasing said poppet valve against its seat, a pressure responsive member for deforming said spring to bias said poppet against its seat as pressure from said system is supplied to one side of said pressure responsive member, second spring means for opposing deformation of said first spring means by said pressure responsive member until a first generally predetermined pressure is supplied to said one side of said pressure responsive member, means limiting the amount of deformation which said pressure responsive member can produce on said first spring means, and third spring means biasing said poppet valve against its seat with predetermined force.

8. In a system for regulating flow of fluid from a pressure source to first and second fluid pressure motors: a control valve supplied with pressure from said source, first flow communication means communicating the discharge of said control valve with said first fluid pressure motor, second flow communication means communicating the discharge of said control valve with said second fluid pressure motor, a valve seat in said first flow communication means facing in the direction of flow toward said first fluid pressure motor, a first valve poppet for closing off said valve seat, first spring means for biasing said poppet valve against its seat, a first pressure responsive diaphragm for deforming said spring to bias said poppet against its seat as pressure from said system is supplied to one side of said pressure responsive diaphragm, second spring means for opposing deformation of said first spring means by said pressure responsive diaphragm until a first generally predetermined pressure is supplied to said one side of said pressure responsive diaphragm, means limiting the amount of deformation which said pressure responsive diaphragm can produce on said first spring means, a second diaphragm for opposing said first diaphragm when pressure from said system is supplied to one side of said second diaphragm, and third spring means preventing said second diaphragm from opposing said first diaphragm until a second predetermined system pressure is reached.

9. In a pressure regulating valve: a valve body having a valve chamber therein with an inlet and an outlet communicating therewith, a valve seat surrounding said inlet and facing into said chamber, said body member also having a diaphragm chamber spaced on the side of said valve chamber opposite from said valve seat, a diaphragm dividing said chamber into inner and outer opposing chambers, a valve poppet for closing off said seat and having a portion extending into said inner opposing chamber, a first compression spring interpositioned between said diaphragm and said portion of said valve poppet for applying closure force to said valve poppet, means for supplying pressure from said regulating valve to said outer opposing chamber, said valve poppet having a flow passage therethrough, and a valve closure member on the inlet side of said flow passage for preventing flow therethrough into said valve chamber but permitting flow therethrough out of said chamber.

References Cited in the file of this patent
UNITED STATES PATENTS

| | | |
|---|---|---|
| 1,954,427 | Platz | Apr. 10, 1934 |
| 2,275,255 | Freeman | Mar. 3, 1942 |
| 2,312,726 | Munro | Mar. 2, 1943 |
| 2,663,150 | Dolch | Dec. 22, 1953 |